United States Patent [19]

Pinsonneault

[11] Patent Number: 5,112,207
[45] Date of Patent: May 12, 1992

[54] SELF-RELEASING MOLD

[75] Inventor: Alec Pinsonneault, St. Joachim, Canada

[73] Assignee: Build-A-Mold Limited, Windsor, Canada

[21] Appl. No.: 680,291

[22] Filed: Apr. 4, 1991

[51] Int. Cl.⁵ .............................................. B29C 45/44
[52] U.S. Cl. ................................. 425/192 R; 249/68; 249/161; 264/318; 264/334; 425/438; 425/442; 425/444; 425/556; 425/577; 425/DIG. 5; 425/DIG. 58
[58] Field of Search ..................... 264/318, 328.1, 334; 425/192 R, 193, 195, 554, 556, 577, 436 R, 436 RM, 438, 441, 442, 444, DIG. 5, DIG. 58; 249/68, 161, 162

[56] References Cited

U.S. PATENT DOCUMENTS

| | | | |
|---|---|---|---|
| 3,060,509 | 10/1962 | McCubbins, Jr. | 425/577 |
| 4,019,711 | 4/1977 | Altenholf et al. | 425/DIG. 58 |
| 4,184,835 | 1/1980 | Talbot | 425/577 |
| 4,515,342 | 5/1985 | Boskovic | 425/577 |
| 4,880,048 | 11/1989 | Gaulard | 425/577 |
| 4,983,346 | 1/1991 | Curliss et al. | 264/328.1 |

FOREIGN PATENT DOCUMENTS 134439  2/1979  Fed. Rep. of Germany ...... 264/318
648121 10/1962  Italy ........................... 425/DIG. 58

Primary Examiner—Jan H. Silbaugh
Assistant Examiner—Brian J. Eastley
Attorney, Agent, or Firm—Dykema Gossett

[57] ABSTRACT

A mold forms a portion of a part having a first cross-section of a first thickness further removed from a body of the part than a second cross-section of a reduced thickness. The mold includes pairs of mold pins which are moved between a molding position at which they define a cavity to form the portion of the part, to a release position at which they allow the portion to move outwardly of the mold so that the part may be released. In an embodiment, the mold pins are actuated by a first actuator, and a second actuator actuates a plurality of ejector pins to force the part off the mold. In this way, it is ensured that the part is forced off of the mold, which can then be operated without supervision. In a preferred embodiment, a ramp member moves a holder for the mold pins between first and second positions, which causes the mold pins to move between the molding and release positions.

14 Claims, 3 Drawing Sheets

SELF-RELEASING MOLD

BACKGROUND OF THE INVENTION

This application relates to a mold for forming a part having a portion extending away from the body of the part. More particularly, the present invention discloses a mold for forming such a portion wherein the part is automatically forced off the mold.

Plastic parts molded by conventional molds may have a portion utilized as a plug for attaching the part to a body by forcing the plug into an aperture in the body. As an example, the part could be a trim piece attached to a vehicle body. The plug has a first cross-section at a first distance from the body of the part and a second cross-section at a second distance from the body of the part wherein the second cross-section is thinner than the first cross-section and closer to the body of the part. In a sense, these plugs could be said to be dove-tailed in a plane moving away from the body of the part. It is sometimes difficult to define a cavity for forming such a portion of a molded part, since the cavity must allow the portion to be released from the mold when molded, while at the same time must define the dove-tailed shape while molding the portion.

There are known molds which define a dove-tailed cavity by having a pair of mold pins pivot relative to the cavity when actuated by an actuator. In these molds ejector pins are forced upwardly once the part has been formed to force the part away from a mold bottom. As the ejector pins are forced upwardly they also cause the mold pins to pivot outwardly to release the dove-tailed portion of the part. These prior art arrangements have proved somewhat unsatisfactory since the ejector stroke is also used to release and pivot the mold pins. In practice, the part often sticks to the mold pins and does not move off the mold bottom. Thus, an operator must monitor these molds and remove parts which do not move off the mold bottom.

It is an object of the present invention to disclose a mold that is capable of forming a dove-tailed cross-section wherein the part is released and then forced off of the mold such that the mold may be operated automatically, without supervision.

It is further an object of the present invention to disclose such an arrangement which is relatively sturdy, maintenance free, and requires few moving parts.

SUMMARY OF THE INVENTION

In a disclosed embodiment of the present invention, a mold has a mold top movable towards and away from a mold bottom to define a cavity for forming a part. Plastic is injected into the cavity to form the part. The mold bottom preferably has at least one mold pin movable between molding and release positions to define a cavity for forming a portion of a part, such as the dove-tailed plug portion described above.

The mold has an actuator for moving the mold pins between release and molding positions, and a separate actuator for moving ejector pins relative to the mold bottom to force the part away from, and off the mold bottom. The actuator which moves the mold pins is first actuated, and then the actuator for moving the ejector pins is actuated. In this way, it is ensured that the ejector stroke forces the part away from the mold bottom, and is not dissipated in actuating the mold pins to move to a release position. A mold according to the present invention can be relied upon to operate automatically without supervision.

In a preferred embodiment of the present invention there are a plurality of pairs of mold pins spaced between a plurality of ejector pins. The ejector pins are preferably operated by a single hydraulically operated press. Also, the plurality of pairs of mold pins are preferably actuated at a single time.

The pairs of mold pins preferably do not move outwardly of the mold bottom as they move between the molding and release positions. More preferably, a holder moves relative to the mold pins to guide them between the molding and release positions. In a most preferred embodiment of the present invention, the holder is guided on a ramp member moved between two extreme positions. As the ramp member moves relative to the holder, the holder moves relative to the mold pins, and the mold pins are guided between the molding and release positions.

In a method according to the present invention, a mold top is moved to contact a mold bottom. A cavity is defined between the two and fluent plastic is injected into the cavity. When the mold top and bottom are moved together, the mold pins are moved to their molding position. Fluent plastic moves into the cavity defined between the mold top and bottom, and by the mold pins, and forms a part. The part has a portion as described above, which may be dove-tailed, as described above.

Once the part is formed, the mold top may be moved away from the mold bottom to begin the release of the part from the mold. An actuator is moved to move the mold pins to the release position. A second actuator is then moved to force the ejector pins outwardly of the mold bottom and force the part off of the mold bottom. In this way, it is ensured that the part moves off the mold and does not stick when the ejector pins force the part away from the mold. The part is thus moved outwardly of the mold, and the machine may be operated without close supervision.

These and other objects and features of the present invention can be best understood from the following specification and drawings, of which the following is a brief description.

DETAILED DESCRIPTION OF A PREFERRED EMBODIMENT

Figure 1:
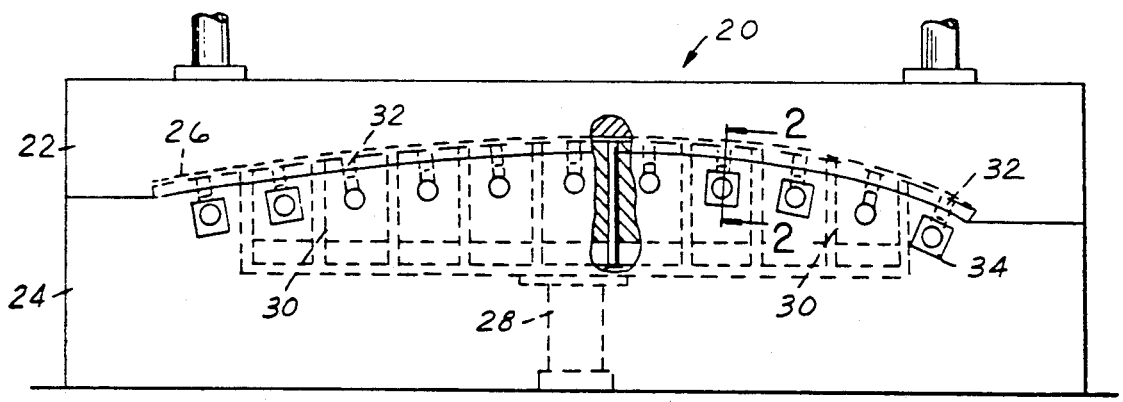
FIG. 1 is a side view of a mold according to the present invention.

Mold 20 is illustrated in FIG. 1 comprising mold top 22 and mold bottom 24. Mold cavity 26 is defined between the two, and receives fluent plastic from a source, not shown, to form a part.

After a part is formed in cavity 26, mold top 22 is moved away from mold bottom 24 and piston 28 is actuated to move a plurality of push-off or ejector pins 30 outwardly of mold bottom 24 and force the part off of mold bottom 24. Piston 28 and ejector pins 30 are well known in the prior art and are shown schematically.

A plurality of mold pin arrangements 32 for forming a dove-tailed, or other shaped portion, are disclosed spaced between ejector pins 30. Actuator 34 actuates arrangements 32 between molding and release positions as will be explained below.

Figure 2:
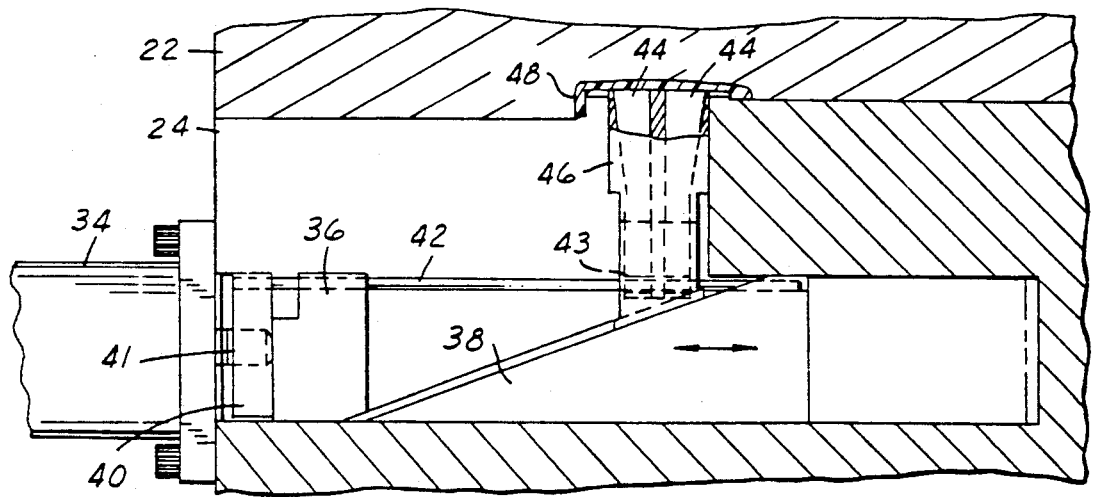
FIG. 2 is a cross-sectional view along line 2—2 as shown in FIG. 1 with a mold in a first molding position.

As shown in FIG. 2, mold top 22 is received against mold bottom 24. Actuator 34 has moved actuator piston 36 to a first position, with ramp cam 38 holding mold pin arrangement 32 in a first molding position. Actuator 34 may be a single press which moves all arrangements 32, or may be individual with each arrangement 32. If it is individual, it is preferred that all arrangements 32 are actuated at a single time. Bolt attachment member 40 is secured to actuator piston 36 through bolt 41. Bolt 42 is fixed to bolt attachment member 40 and extends through apertures 43 in a pair of mold pins 44. Mold pins 44 define a cavity for forming a portion of the part which is molded in mold 20. Mold pin holder 46 is in contact with ramp cam 38, and moves between a pair of positions to guide mold pins 44 between a molding and release position. The pair of mold pins 44 are shown below a main body of part 48 and form a dove-tailed portion of part 48 which extends away from the main body of part 48.

As shown with reference to FIG. 2, bolt 41 holds bolt attachment 40 to actuator piston 36. Should it be desired to remove mold pins 44 from mold bottom 24, bolt attachment 40 is removed by removing bolt 41. Once bolt attachment 40 is removed from actuator piston 36, bolt 42 is pulled outwardly of apertures 43. Mold pins 44 may then be removed upwardly from mold bottom 24. In this way, mold pins 44 may be removed for service, replacement or repair without fully disassembling mold bottom 24.

In FIG. 2, the pair of mold pins 44 is shown in a molding position. Ramp cam 38 is shown with a higher portion underlying mold pin holder 46.

Figure 3:
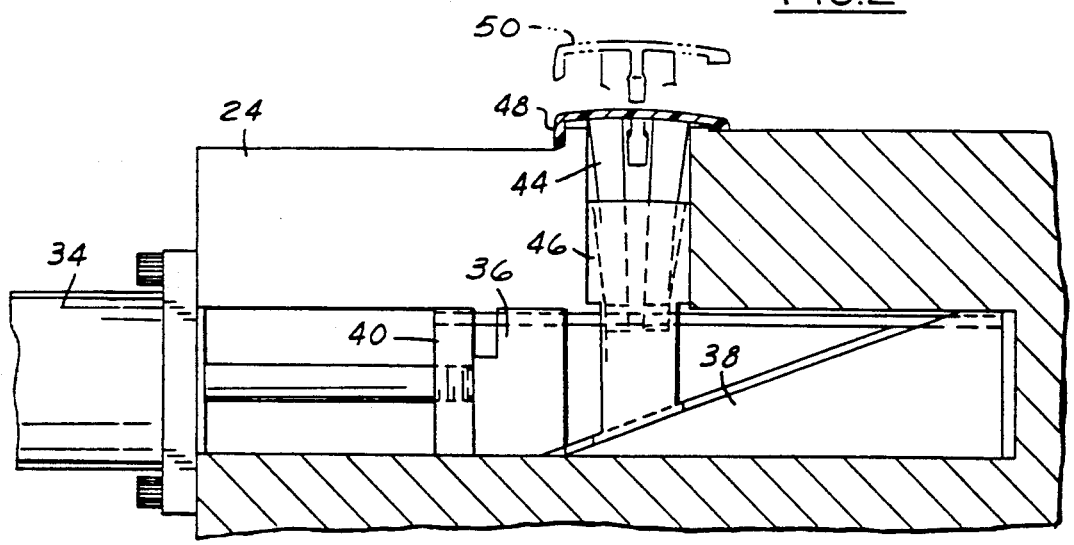
FIG. 3 is a view similar to FIG. 2, but showing the mold moved to a second release position.

As shown in FIG. 3, ramp cam 38 has been moved to the right from the position shown in FIG. 2 such that a lower portion of ramp cam 38 supports and guides mold pin holder 46. Mold pin holder 46 moves downwardly, as orientated in this figure, and the pair of mold pins 44 pivot outwardly, such that part 48 can move off of mold bottom 24.

Ramp cam 38 is moved to the position shown in FIG. 3 by actuator 34 once part 48 has been fully formed. Actuator piston 28 is then actuated to move ejector pins 30 outwardly of mold bottom 34, and part 48 is forced off of mold bottom 24, to removed position 50.

Figure 4:
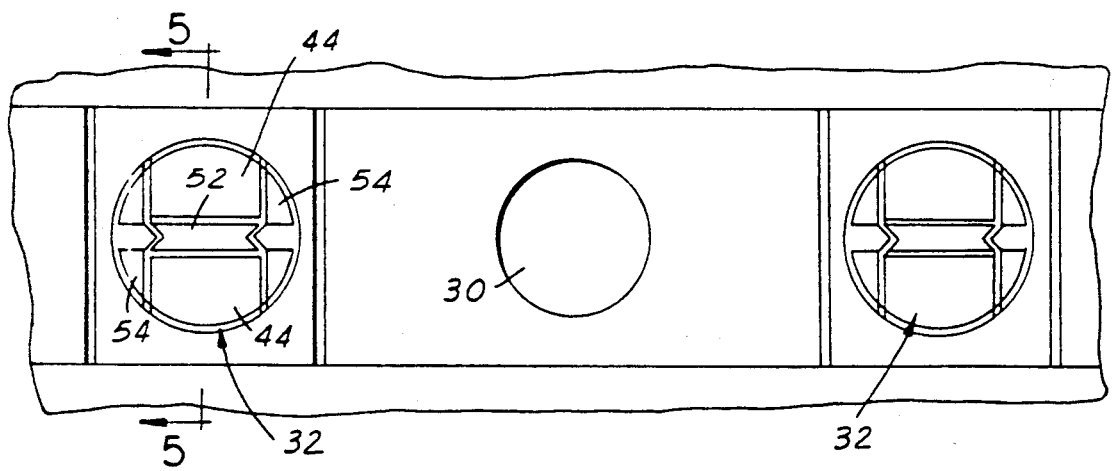
FIG. 4 is a view looking downwardly on a bottom mold.
Figure 8:
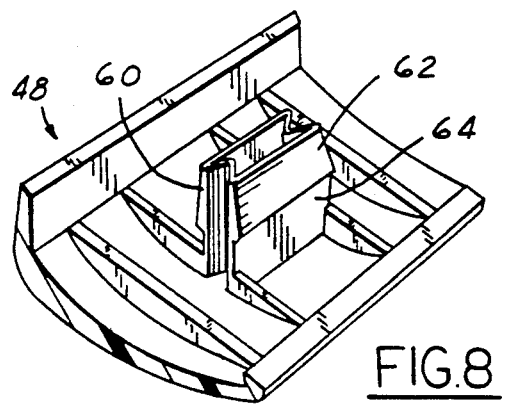
FIG. 8 is a perspective view of a part formed by a mold according to the present invention.

FIG. 4 is a top view of mold bottom 24 and shows several details of mold pin arrangement 32. A pair of mold pins 44 is shown, along with mold pin holder side members 54, and a mold pin holder central member 52. A plurality of slots are disclosed between the various members 44, 52, 54 for defining a cavity to form various surfaces on part 48; corresponding structure of one embodiment of a part 48 is illustrated in FIG. 8. As shown, ejector pin 30 is spaced between adjacent mold pin arrangements 32.

Figure 5:
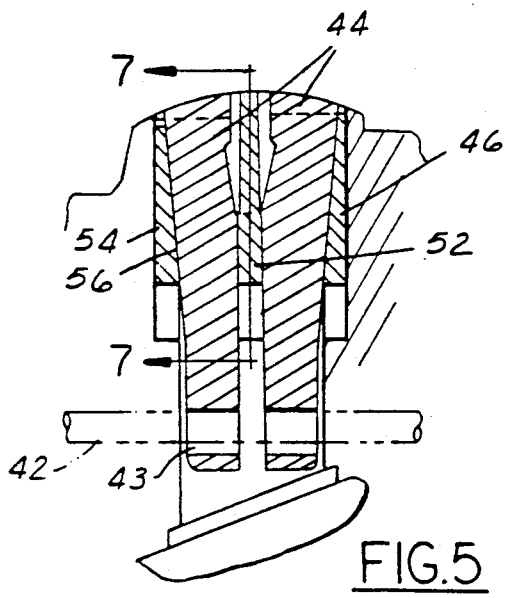
FIG. 5 is a view along line 5—5 as shown in FIG. 4, with the mold in the first position illustrated in FIG. 2.

As shown in FIG. 5, the pair of mold pins 44 are in the molding position, also illustrated in FIG. 2. Mold pin holder side members 54 have an internal cam surface 56 which maintains the pair of mold pins 44 inwardly towards mold pin holder center member 52 to define a cavity for forming a portion of part 48. Bolt 42 extends freely through apertures 43 to guide the pair of mold pins 44. Mold pin holder central member 52 contacts a portion of the pair of mold pins to provide further guidance.

Figure 6:
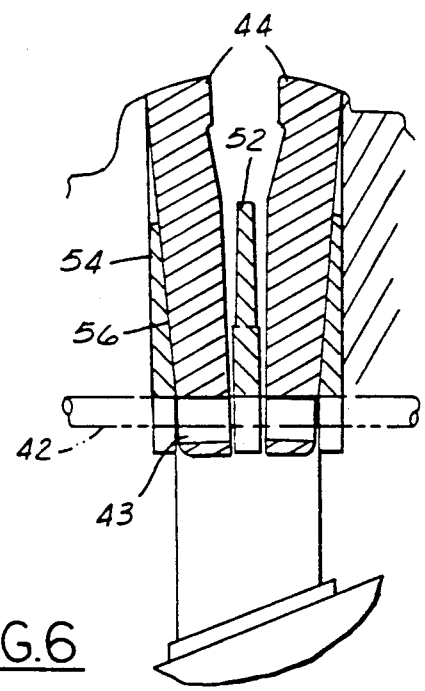
FIG. 6 is a view similar to FIG. 5, but showing the mold having been moved to the second position illustrated in FIG. 3.

Arrangement 32 is shown in FIG. 6 having been moved to the release position, also illustrated in FIG. 3. Mold pin holder 46 has moved downwardly on ramp cam 38, and cam surface 56 has moved along the pair of mold pins 44. The mold pins 44 pivot outwardly on bolt 43 away from pin holder center member 52 to release the portion of part 48 formed in the cavity defined between the pair of mold pins 44.

An uppermost surface of mold bottom 24 could be defined, and mold pins 44 will not move outwardly of this surface in either the molding or release positions. This protects mold pins 44 from damage. Ejector pins 30 do move outwardly of the uppermost surface.

Figure 7:
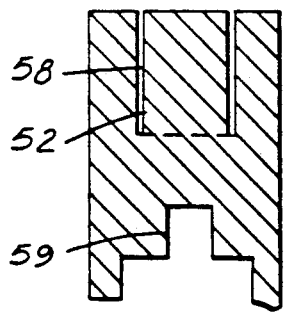
FIG. 7 is a cross-sectional view along line 7—7.

FIG. 7 is a cross-sectional view along line 7—7 as shown in FIG. 5. Mold pin center member 52 has slots 58 for forming a portion of part 48. Guide surface 59 rides on a corresponding cross-section portion of ramp cam 38 to guide mold pin holder 46 between its two extreme positions, as illustrated in FIGS. 5 and 6.

FIG. 8 is a perspective view of a part 48 which may be formed by mold 20 according to the present invention. Plugs 60, which include portion 62 which may be defined as dove-tailed, or undercut, is formed by the pair of mold plugs 44. A reduced portion 64 is formed closer to the body of part 48 than larger portion 62. It could be said that plug 60 comprises a first portion 62 of a first cross-sectional thickness at a first distance removed from the body of part 48 and a second portion of a second cross-sectional thickness at a second distance from the body of part 48, wherein the second portion is of a smaller thickness and closer to the body of part 48. That portion 62 is larger than portion 64 requires that some actuated mechanism, such as mold pin 44, be utilized to form the mold cavity.

Although a specific dove-tailed portion is disclosed in the references, it should be fully understood that any shape portion may be formed by this invention. Preferably, any portion having a first thickness further removed from the body of the part than a second thickness, which is smaller than the first thickness, would come within the scope of this invention. Further, although pairs of mold pins 44 are disclosed in this application, it should be understood that a single mold pin 44 could define a cavity and also achieve several inventive features of this invention.

Figure 9:
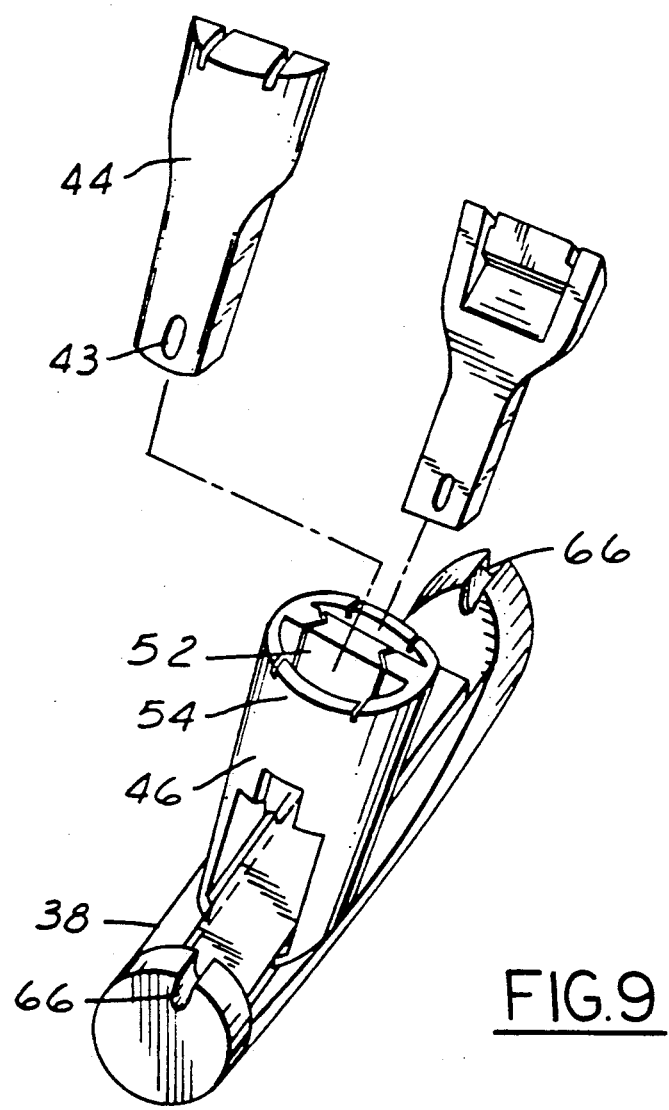
FIG. 9 is a perspective view of a portion of a mold according to the present invention.

FIG. 9 illustrates further features of mold pin arrangement 32. As shown, a pair of mold pins 44 are received between mold pin holder center portion 52 and sides 54. Bolt groove 66 is formed at each end of ramp cam 38 to receive bolt 42. It should be understood that bolt 42 can be removed along with bolt attachment 40 such that mold pins 44 can be removed from mold pin holder 46 for replacement or repair. As described above, this allows mold pins 44 to be removed from mold bottom 24 without disassembly.

A preferred embodiment of the present invention has been disclosed, however, a worker of ordinary skill in the art would recognize that certain modifications would come within the scope of this invention. For this reason, the following claims should be studied in order to determine the true scope and content of the present invention.

I claim:

1. A mold comprising:

a mold top and a mold bottom selectively movable towards each other to define a cavity therebetween, a plastic injection port injecting fluent plastic into the cavity to form a part, at least one mold pin associated with said mold bottom to define a cavity portion to form a portion of the part, said portion of the part extending away from a body of the part, said mold pin being movable from a molding position at which it defines a cavity to form the portion of the part and a release position at which it allows the portion of the part to move outwardly of the cavity to release the part;

first means to move said mold pin between said molding position and said release position, and second means to eject the part from the mold after said mold pin has moved to said release position;

said first means to move said mold pin between the molding and release positions includes a ramp member and a holder causing said mold pin to move between said molding and release positions, said ramp being moved to move the holder relative to said mold pin, and said holder camming said mold pin between said molding and release positions; and a bolt extends freely through an aperture in said mold pin, said bolt moving with said ramp member, said bolt being removable from said ramp member such that said mold pin can be removed from said mold bottom.

2. A mold as recited in claim 1, wherein there are plurality of mold pins and said second means to eject comprising at least one ejector pin driven to eject the part off of the mold bottom, said ejector pins being spaced from said mold pin.

3. A mold as recited in claim 2, wherein the portion of the part having at least a first cross-section of a first thickness received a first distance away from the body of the part and a second cross-section of a second thickness, the second thickness being smaller than the first thickness, the second cross-section being received at a second distance from the body of to the part which is less than the first distance.

4. A mold as recited in claim 3, wherein said mold pin having a smaller thickness portion associated with said first cross-section and a larger thickness portion associated with said second cross-sectional portion.

5. A mold as recited in claim 2, wherein said plurality of mold pins includes a plurality of pairs of mold pins.

6. A mold as recited in claim 1, wherein said mold bottom defining an uppermost surface, and said mold pin not moving outwardly of said mold bottom as said mold pin moves between said molding and release positions.

7. A mold as recited in claim 1, wherein there is at least one pair of said mold pins defining the cavity portion, and a holder member is moved relative to said pair of mold pins to cause said mold pins to move between said molding and release positions.

8. A mold as recited in claim 1, wherein there are a plurality of pairs of said mold pins, and said first means to move said mold pins between said molding and release positions actuating the plurality of pairs of mold pins at a single time.

9. A mold comprising:

a mold top and a mold bottom selectively movable towards each other to define a cavity therebetween, a plastic injection port injecting fluent plastic into the cavity to form a part;

a plurality of pairs of mold pins associated with said mold bottom for each forming a part portion of the part, the portions each extending away from a body of the part, the part portion having at least one cross-section of a first thickness received a first distance away from the body of the part and a second cross-section of a second thickness, the second thickness being smaller than the first thickness, the second cross-section being received closer to the body of part than the first section, each portion of the part being formed by one of said pairs of mold pins, said pair of said mold pins being movable relative to said mold bottom from a molding position at which they define a cavity to form the part portion, and a release position at which they allow the part portion to move outwardly of said mold bottom to release the part, each of said mold pins having a smaller thickness portion associated with said first cross-section and a larger thickness portion associated with said second cross-section;

said plurality of pairs of mold pins spaced along said mold bottom, and a plurality of ejector pins spaced between said plurality of pairs of mold pins, said plurality of ejector pins being actuated by a press element to force said ejector pins outwardly of said mold bottom and eject a part off said mold bottom; and means to move said plurality of pairs of mold pins between said molding and release positions and separate means to move said ejector pins outwardly of said mold bottom.

10. A mold comprising:

a mold top and a mold bottom selectively movable towards each other to define a cavity therebetween, a plastic injection port injecting fluent plastic into the cavity to form a part;

a plurality of pairs of mold pins associated with said mold bottom for each forming a portion of the part, the part portions each extending away from a body of the part, the part portion having at least one cross-section of a first thickness received a first distance away from the body of the part and a second cross-section of a second thickness, the second thickness being smaller than the first thickness, the second cross-section being received closer to the body of part than the first section, each portion of the part being formed by one of said pairs of mold pins, said pair of said mold pins being movable relative to said mold bottom from a molding position at which they define a cavity to form the part portion, and a release position at which they allow the part portion to move outwardly of said mold bottom to release the part, each of said mold pins having a smaller thickness portion associated with said first cross-section and a larger thickness portion associated with said second cross-section;

said plurality of pairs of mold pins spaced along said mold bottom, and a plurality of ejector pins spaced between said plurality of pairs of mold pins, said plurality of ejector pins being actuated by a press element to force said ejector pins outwardly of said mold bottom and eject a part off said mold bottom;

means to move said plurality of pairs of mold pins between said molding and release positions and separate means to move said ejector pins outwardly of said mold bottom; and said mold bottom defining an uppermost surface, and said pairs of mold pins not moving outwardly of said uppermost surface as said pairs of mold pins move between said molding and release positions, said ejector pins moving outwardly of said uppermost surface when forced by said press element.

11. A mold as recited in claim 9, wherein said means to move said plurality of pairs of mold pins between said molding and release positions actuating said plurality of pairs of mold pins at a single time.

12. A mold comprising:

a mold top and a mold bottom selectively movable towards each other to define a cavity therebetween, a plastic injection port injecting fluent plastic into the cavity to form a part;

at least a pair of mold pins associated with said mold bottom for each forming a portion of the part, the part portions each extending away from a body of the part, the part portion having at least one cross-section of a first thickness received a first distance away from the body of the part and a second cross-section of a second thickness, the second thickness being smaller than the first thickness, the second cross-section being received closer to the body of part than the first section, each portion of the part being formed by one of said pairs of mold pins, said pair of said mold pins being movable relative to the mold bottom from a molding position at which they define a cavity to form the part portion, and a release position at which they allow the part portion to move outwardly of said mold bottom to release the part, each of said mold pins having a smaller thickness portion associated with said first cross-section and a larger thickness portion associated with said second cross-section;

said pair of mold pins spaced along said mold bottom, and at least one ejector pin spaced between said at least one pair of mold pins, said at least one ejector pin being actuated by a press element to force said ejector pin outwardly of said mold bottom and eject a part off said mold bottom;

means to move said at least one pair of mold pins between said molding and release positions and separate means to move said ejector pin outwardly of said mold bottom; and said means to move said at least one pair of mold pins between said molding and release positions including a ramp member and a holder for each pair of mold pins, said ramp member being moved to move the holder relative to said pair of mold pins, and said holder camming said at least one pair of mold pins between said molding and release positions.

13. A mold as recited in claim 12, wherein said mold bottom defining an uppermost surface, and said pairs of mold pins not moving outwardly of said uppermost surface as said pairs of mold pins move between said molding and release positions.

14. A mold as recited in claim 13, wherein a bolt extends freely through apertures in both of said pair of mold pins in each of said pairs, said bolt moving with said ramp member, said bolt being removable from said ramp member such that each of said pair of mold pins can be removed from said mold bottom.

* * * * *